United States Patent [19]

Hapner et al.

[11] Patent Number: 5,727,203
[45] Date of Patent: Mar. 10, 1998

[54] METHODS AND APPARATUS FOR MANAGING A DATABASE IN A DISTRIBUTED OBJECT OPERATING ENVIRONMENT USING PERSISTENT AND TRANSIENT CACHE

[75] Inventors: Mark W. Hapner, San Jose; Roderic G. Cattell, Los Altos, both of Calif.

[73] Assignee: Sun Microsystems, Inc., Mountain View, Calif.

[21] Appl. No.: 414,119

[22] Filed: Mar. 31, 1995

[51] Int. Cl.$^6$ ............................................ G06F 17/30
[52] U.S. Cl. .................... 395/614; 395/608; 395/618; 395/705
[58] Field of Search ................ 364/200; 395/425, 395/600, 700, 474, 250, 650, 608, 472, 614, 705

[56] References Cited

U.S. PATENT DOCUMENTS

| | | | |
|---|---|---|---|
| 4,989,132 | 1/1991 | Mellender et al. | 364/200 |
| 5,025,370 | 6/1991 | Koegel et al. | 364/200 |
| 5,057,996 | 10/1991 | Cutler et al. | 364/200 |
| 5,247,669 | 9/1993 | Abraham et al. | 395/600 |
| 5,261,069 | 11/1993 | Wilkinson et al. | 395/472 |
| 5,313,629 | 5/1994 | Abraham et al. | 395/600 |
| 5,396,630 | 3/1995 | Banda et al. | 395/700 |
| 5,437,027 | 7/1995 | Bannon et al. | 395/614 |
| 5,452,447 | 9/1995 | Nelson et al. | 395/650 |
| 5,493,728 | 2/1996 | Solton et al. | 395/250 |
| 5,504,895 | 4/1996 | Kurosawa et al. | 395/650 |
| 5,542,078 | 7/1996 | Martel et al. | 395/600 |
| 5,542,088 | 7/1996 | Jennings, Jr. et al. | 395/650 |
| 5,553,267 | 9/1996 | Herlihy | 395/474 |
| 5,557,793 | 9/1996 | Koerber | 395/614 |
| 5,560,005 | 9/1996 | Hoover et al. | 395/600 |
| 5,615,362 | 3/1997 | Jensen et al. | 395/614 |

OTHER PUBLICATIONS

Liedtke, J. "A Short Note on Implementing Thread Exclusiveness and Address Space Locking", Operating Systems Review, vol. 28, No. 3, pp. 38–42, Jul. 1, 1994.

Rothermel, Kurt "An Open Commit Protocol Preserving Consistency in the Presence of Commission Failures", Distributed Computing Systems, 1993 International Conference, pp. 168–177, 1993.

Petzold, Charles "Installing Traffic Lights Under Windows NT", PC Magazine, vol. 12, No. 16, pp. 339–334, Sep. 28, 1993.

Jacquemot et al. "Cool: The Chorus CORBA Compliant Framework", COMPCON Spring '94 IEEE Computer Society International Conference, pp. 132–141, 1994.

Chapin, Susan et al. "Security for the Common Object Request Broker Architecture (CORBA)", pp. 21–30, 1994.

Al-Salqant et al. "MediaWare: A Distributed Multimedia Environment with Interoperability", pp. 128–137, 1995.

(List continued on next page.)

Primary Examiner—Thomas G. Black
Assistant Examiner—Charles L. Rones
Attorney, Agent, or Firm—Hickman Beyer & Weaver, LLP

[57] ABSTRACT

A variety of methods and apparatus for managing a database in a object oriented environment are disclosed. According to the present invention, a database is provided which includes a database cache and a persistent database portion. Clients of the database are able to write quickly and asynchronously to the database cache, which may be located in transient memory such as random access memory. In order to maintain consistency between the state of the client and the state in the database, the data in the database cache must be written to the persistent database portion. In preferred embodiments a time commit thread executing in a computer process will, in single operations performed at predetermined intervals and when predetermined conditions are met, commit the data in the database cache into the persistent database portion. Thus through the strategies of the present invention, a single client database can have multiple clients. Clients of the database may be a variety of computer entities which require a mechanism for maintaining persistent state. In particular, objects are contemplated. In an apparatus embodiment of the present invention, a computer system having a central processing unit, a transient memory, a persistent memory, and a database is disclosed.

40 Claims, 9 Drawing Sheets

OTHER PUBLICATIONS

Adler, Richard M., "Emerging Standards for Component Software", pp. 68–77, 1995.

Dogas et al. "A Multidatabase System Implementation on CORBA", pp. 2–11, Jul. 1996.

Svedlow et al. "Tactics: A CORBA–Based Distributed Processing Infrastructure", Digital Avionics Systems, 1995 Conference, pp. 293–298.

Habbash et al. "Towards an Efficient Management of Objects in a Distributed Environment", Databases in Parallel and Distributed Systems, 1990 Symp., pp. 181–190.

Nicol et al. "Object Orientation in Heterogenous Distributed Computing Systems", IEEE Computing Magazine, pp. 57–67, Jun. 1993.

Black et al. "Implementing Location Independent Invocation", The 9th Annual International Conference on Distributed Computing Systems, IEEE Computer Society Press, pp. 550–559, Jun. 5, 1989.

METHODS AND APPARATUS FOR MANAGING A DATABASE IN A DISTRIBUTED OBJECT OPERATING ENVIRONMENT USING PERSISTENT AND TRANSIENT CACHE

BACKGROUND OF THE INVENTION

The present invention relates to the fields of distributed computing systems, client server computing and object-oriented programming. More specifically, the present invention teaches methods and apparatus for managing a database within a distributed object operating environment.

Object oriented programming methodologies have received increasing attention over the past several years in response to the growing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle." That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and/or procedures of the object are relatively isolated from the remainder of the program. This provides code that is more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

A more recent advance in the field of object oriented methodologies has been the implementation of distributed object operating environments over computers interconnected via a computer network. As used herein, the term "distributed object" or "object " refers to an encapsulated package of code and data that can be manipulated by operation through an interface. Thus, distributed objects will be seen by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an interface definition language (IDL) that can be mapped to a variety of different programming languages. One such interface definition language is Object Management Group's IDL. Second, distributed objects are location-independent, i.e., distributed objects can be located anywhere in a network. This contrasts sharply with traditional programming objects which typically exist in a single address space.

Distributed objects can be object clients or object servers, depending upon whether they are sending requests to other objects or replying to requests from clients. In a distributed object operating environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service. In the following discussion, the terms "object" and "distributed object" will be used interchangeably.

As will be appreciated by those skilled in the art, objects may be broken down (figuratively) into two components: code and state. Code is essentially the executable computer instructions by which the object operates. State is thus the remaining portion of the object such as data which is not code. In general, most objects require some type of persistence strategy for maintaining their state. In explanation, a persistence strategy is the mechanism by which objects manage their state, enabling objects to systematically perform operations on their state such as reading, writing, deleting, and changing. By way of example, a document object will need a persistence strategy to maintain its text in some type of permanent, mass storage device.

In prior solutions, objects were required to implement their own persistent storage mechanism or rely on a multiple client database implemented by their host computer operating system. (Note that databases are by definition persistent.) In the first persistence strategy, each object maintains its own, distinct database. As a result, each object needs code specifically directed towards database management, code which is otherwise not related to the purpose of the object and thus an undue burden on the programmer. Furthermore, as will be appreciated by those skilled in the art, each distinct database will have a minimum amount of overhead (such as file descriptors and allocated blocks of memory which may not be utilized). Hence this system is inefficient in terms of resource utilization, both in system resources and program development time.

In the second persistence strategy the database is a multiple client database able to accept data write operations from multiple clients. As will be appreciated by those skilled in the art, the multiple client database is a more sophisticated database and therefore requires additional programming and system resources. For example, the multiple client database manager must use multiple buffers and also assert locks on unique portions of the database. Then the database manager must assure that any changes occur to the database systematically. To do this, the database manager must define a single sequence of actions which provide a consistent result. As will be appreciated by those skilled in the art, this "serialization" requirement is a difficult task.

Thus current solutions provide two possible persistent strategies, neither of which are quite satisfactory. On the one hand, if a multiple client database is implemented, the cost in terms of system resources is expensive, as multiple buffers must be used and unique portions of the database reserved for single users. On the other hand, if each client maintains its own database, the system resources are not utilized efficiently as the overhead for each database is redundant. Furthermore, the programmer of each client must perform the additional coding for the database. This is not only a waste of programming resources, it is an unsound strategy. As discussed previously, one of the goals of OOP is to refine techniques and develop tried and true objects. But in this case, each object is required to perform the redundant task of database management and each time this task is done presents yet another opportunity for error. What is needed is a method for multiple clients to act as a single user of a database. This method should further require a minimum of client resources directed towards the database. Furthermore, since the database will be accessed by multiple clients, the persistence strategy must include sophisticated mechanisms and apparatus for synchronizing the different data write operations.

SUMMARY OF THE INVENTION

To achieve the foregoing and other objectives and in accordance with the purpose of the present invention, methods, apparatus and data structures for managing a database are disclosed. In a first method aspect of the present invention, a computer implemented method for managing a database resident in a computer system is disclosed. The computer system is intended for use in a distributed object operating environment and the database has a database cache and a persistent database. The method includes computer controlled steps such as performing a data write operation that writes data into the database cache, the data written into the cache being intended for storage in the persistent database. In conjunction with the data write operation, a cache dirty variable is set to a first state reflecting that the database cache includes data intended for storage in the persistent database. At some point following the data write operation, a data commit operation which writes the data from the database cache into the persistent database is performed. Then, after performing the data commit operation, the cache dirty variable is (re)set to a second state which indicates that the database cache no longer has data which must be committed to the persistent database.

In a related method aspect of the invention, the above-mentioned data write operation includes steps of incrementing a transaction counter by a predetermined value, writing the data intended for the persistent database into the database cache, and subsequently decrementing the transaction counter. Thus the transaction counter maintains a value indicative of the number of active data write operations. In another related method aspect of the invention, prior to incrementing the transaction counter, a cache commit request variable is evaluated to determine if a commit operation is active. If a commit operation is active, then each of the transaction counter incrementing, data writing, and transaction counter decrementing steps are delayed until the cache commit request variable transitions to indicate that the data commit operation in not active. However, if no commit operation is active, then these steps may be performed substantially immediately.

In another related method aspect of the invention, the data commit operation will set the cache commit request variable to indicate that the data commit operation is active. The data commit operation may also include the step of determining whether there are any active data write operations based on the value stored in the transaction counter, wherein when it is determined that no data write operations are active the data in the database cache is written into the persistent database and the cache commit request variable is set to indicate that said data commit operation is not active. Thus active data write operations are allowed to complete but no new data write operations can begin when a data commit operation is pending.

In another aspect of the present invention, a method for performing an orderly shutdown of a time commit thread which is managing the database is disclosed. According to one aspect, the method includes computer controlled steps of receiving a start shutdown command and determining whether there is any data in the database cache based upon the state of the cache dirty variable, wherein when it is determined that there is no data in the database cache the shutdown is complete. In response to the start shutdown command, there are at least two other possible shutdown threads of execution which may be performed. Each of these two begin by determining whether there is any data in the database cache based upon the state of the cache dirty variable. In a first embodiment, it is determined that there are no active data write operations and therefore a data commit operation is performed and the shutdown is complete. In a second embodiment, it is determined that there are active data write operations and as a result a warning is transmitted indicating to all active data write operations that an abort is impending, all active data write operations are aborted and the shutdown is complete. In each of these cases the time commit thread is terminated appropriately.

In a separate aspect, a computer implemented method for performing a data write operation to a database cache portion of a database is disclosed. The data write operation includes the steps of setting a cache dirty variable to a state that indicates that the database cache contains data which is intended for the persistent database, incrementing by a predetermined value a transaction counter which indicates the number of active data write operations, writing the data intended for the persistent database to the database cache after the transaction counter incrementing step, and decrementing the transaction counter by the predetermined value in conjunction with the data writing step.

In another separate aspect, a computer implemented method for committing data from a database cache to a persistent database is disclosed. The database cache and the persistent database are each an element of a database which is intended to reside in a computer system, the computer system being suitable for use in a distributed object operating environment. The method includes the steps of determining whether a cache dirty variable indicates that the database cache includes data intended for the persistent database, setting a cache commit request variable to indicate that a commit data operation is in progress when it is determined that the database cache includes data intended for the persistent database, after the cache commit request variable setting step, determining whether a transaction counter indicates that data write operations are active, the data write operations being operable to write data to the database cache, committing data in the database cache to the persistent database when the transaction counter indicates that no data write operations are active, and after the committing data step, setting the cache dirty variable to indicate that the database cache does not include data intended for the persistent database.

According to one apparatus embodiment of the present invention, a computer system for use in a distributed object operating environment includes a central processing unit, a transient memory including random access memory, a persistent memory including a mass storage device and a database. The database includes a database cache resident in said transient memory and a persistent database resident in the persistent memory. The database cache is arranged to receive and store client data via data write operations performed by a plurality of database clients. The persistent database is arranged to receive and store cache data via data commit operations, the data commit operation being operable to commit the client data stored in the database cache to the persistent database. In a related embodiment, the database cache is resident in a computer process executing within the computer system.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

Figure 1:
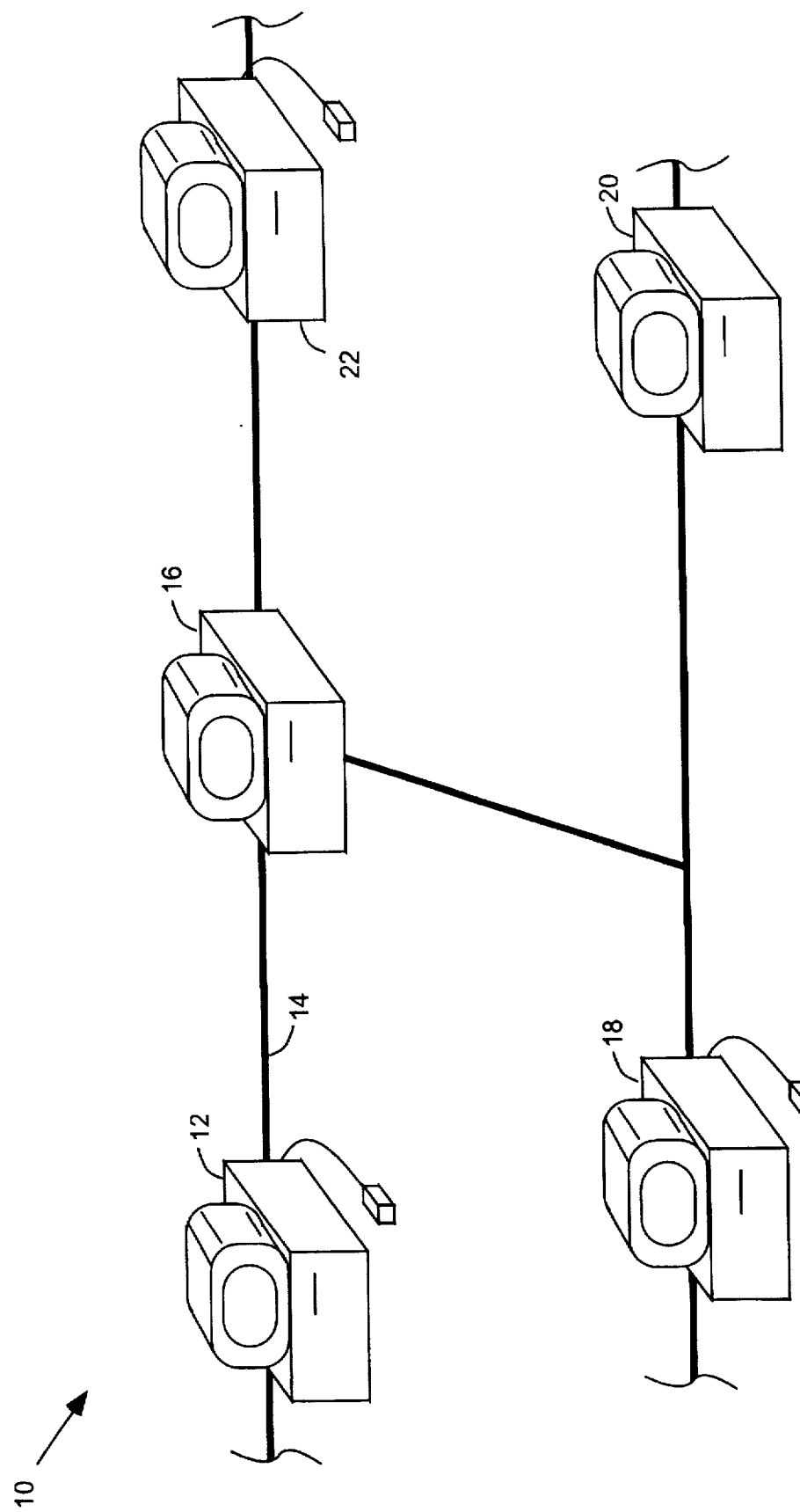
FIG. 1 is a pictorial illustration of various computers linked together in a computer network.

The present invention relates to a distributed operating environment based on object oriented programming (OOP). More specifically, this invention discloses methods and apparatus for managing a database in a distributed object operating environment. Following the Definition of Terms, the methods and apparatus will be discussed in more detail, first through discussing example computer systems which are suitable for the present invention, next continuing with a detailed description of several embodiments of the apparatus and data structures of the present invention, and then further through the detailed description of the method aspects of the present invention.

I. Definition of Terms

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is OMG's IDL. Second, distributed objects are location-independent, i.e., distributed objects can be located anywhere in a network. This contrasts sharply with traditional programming objects which typically exist in the same address space as the client. Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "object" is an object that contains a pointer to another object. Additionally, an object can include a portion of memory (the "sub-object identifier") which can be used for identifying a sub-object. With the exception of the sub-object identifier, the creation and definiton of object references will be familiar to those skilled in the art. A "client" as defined herein refers to an entity that sends a request to second object. In this model, the second object is referred to as a "server object" or a "target object". Thus, clients invoke operations, or implementations, from servers. In a distributed object environment, clients need not have knowledge of the implementation programming language, nor does the implementation have to have knowledge of the client's programming language due to the requirement of multilingual character of such objects. Clients and servers in distributed object environments need only communicate in terms of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using an IDL. As noted above, objects perform transactions through their interfaces. The use of interfaces therefore relieves the need of objects that are aware of the programming languages used to define the methods and data of the objects in the transaction.

II. Managing a Database

According to the present invention, a database is provided which includes a database cache and a persistent database portion. Clients of the database are able to write quickly and asynchronously to the database cache, which may be located in transient memory such as random access memory. In order to maintain consistency between the state of the client and the state in the database, the data in the database cache (which is transient) must be committed to the persistent database portion. In preferred embodiments a time commit thread will, at predetermined intervals and when predetermined conditions are met, commit that data resident in the database cache which is intended for the persistent database portion. The time commit thread is a thread of execution. As is well known to those skilled in the art of object oriented programming, a thread of execution is essentially a sequential flow of the point of execution through a computer process.

Clients of the database may be a variety computer entities which require a mechanism for maintaining persistent state. In particular, distributed objects are contemplated. Typically, distributed objects are implemented (by the ORB and/or the host computer) under computer processes. Computer processes provide a well known and common framework under which computer systems implement different threads of execution. By way of analogy, a computer process can be thought of as a domain partitioned within a computer system.

In actuality, a process typically includes address space (i.e., a portion of memory allocated to only the process), a set of file descriptors, a process identification number, and one or more threads of execution (often referred to as threads). Multi-threaded systems, such as contemplated by the present invention, allow for multiple threads to run concurrently in a single process. For a more detailed description of threads, multithreaded processes, and principles of concurrency, please see "Concurrency Within DOE Object Implementations" by Dr. Robert Hagmann, Version 0.91, May 27, 1993, published by SunSoft and incorporated herein by reference in its entirety.

As a direct result of the framework of computer processes, all entities residing under a single process will share resources (i.e. memory and files). Thus multiple distributed objects residing in a single process will have efficient communications via local transport. Furthermore, data can be loaded into memory that all objects residing in the single process will have direct access to. Thus a process may maintain its own database within its memory. However, programmers may have other motivations (beyond efficient transport and data sharing) which negate the advantages gained by having many objects in a single process. For instance, different objects will have different objectives and may rely on different assumptions about the process. These motivations generate a need for orderly, multi-process distributed object operating environments as disclosed by the present invention. In allowing programmers to keep objects within separate processes, the ORB may prevent conflict between and maintain the integrity of objects within processes. As a case in point, an object in a first server process may go into an error condition and begin chaotically writing within its server process memory. Nevertheless, objects running in separate server processes will remain intact since these processes have their own memory, files, and flow control. Thus, in preferred embodiments of the present invention, a database is maintained by each of the separate server processes.

In a preferred embodiment of the present invention, distributed objects, computer processes, databases in accordance with the present invention and clients of the database are resident on one or more computers linked together by a network. The network may take any suitable form. By way of example, a representative network arrangement 10 is illustrated in FIG. 1. The network arrangement 10 includes a first computer 12 which is coupled to a transmission line 14. The network 10 further includes a server, router or the like 16 in addition to other computers 18, 20, and 22 such that data and instructions can be passed among the networked computers. The design, construction and implementation of computer networks will be familiar to those of skill in the art.

Figure 2:
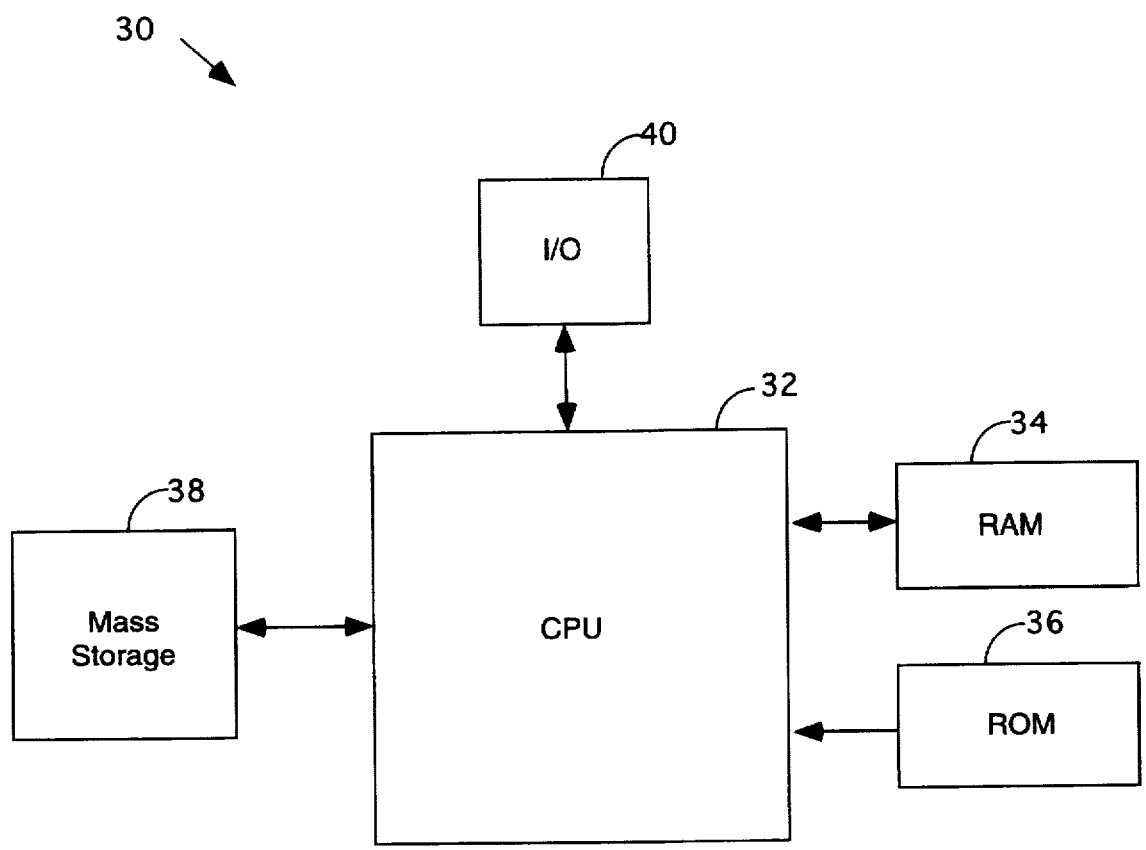
FIG. 2 illustrates diagramatically the major components of a computer in FIG. 1.

A representative computer 30 suitable for use as computers 12, 18, 20, and/or 22 of FIG. 1 is illustrated schematically in FIG. 2. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including distributed objects and their associated code and state, for processes currently operating on CPU 32. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like. Each of the above described computers optionally includes an input/output source 40 that typically includes input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as the networking devices, are of standard design and construction, and will be well familiar to those skilled in the art.

Figure 3:
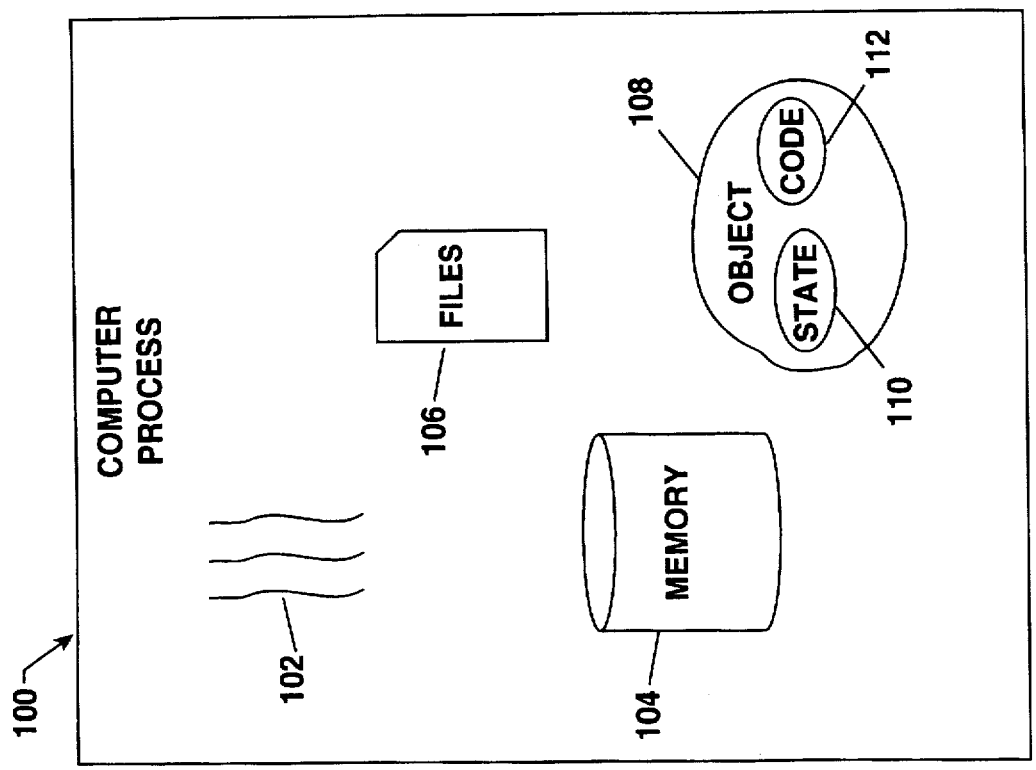
FIG. 3 is a pictorial illustration of a computer process in accordance with one embodiment of the present invention, wherein the computer process has multiple threads of execution, file identifiers, memory allocation, and an object resident therein.

FIG. 3 illustrates a multi-threaded process 100 in accordance with one embodiment of the present invention. The process 100 may be implemented on a computer such as computer 30 and includes multiple threads such as thread 102, allocated memory 104 which may include both persistent and transient memory, file identifiers 106, and at least one object such as object 108. The object 108 includes state 110 and code 112. The object 108 is typically defined by the state 110 and the code 112. Code 112 is essentially the operating instructions by which the object executes. State 110 is thus the remaining portion which is not executable code.

Figure 4:
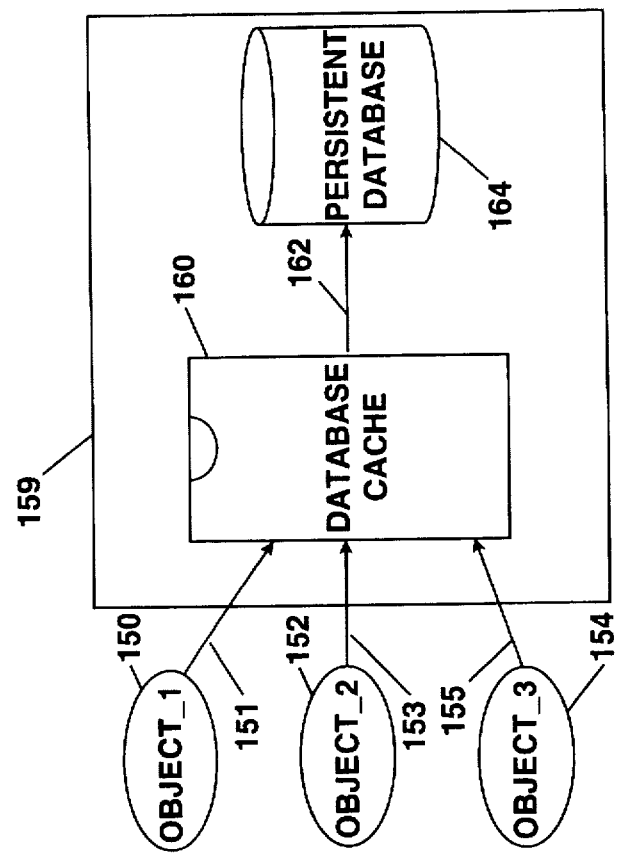
FIG. 4 is a diagrammatic illustration showing the flow of data write operations from three different objects into a database cache and the subsequent data commit operation from the database cache into a persistent database, a database made up of the database cache and the persistent database, all in accordance with one aspect of the present invention.

FIG. 4 provides a generic paradigm for use in several specific embodiments of the present invention. In the paradigm of FIG. 4, multiple clients such as object __1 150, object __2 152, and object__3 154 of the database 159 may each write data asynchronously into a database cache 160 through multiple data write operations such as write__1 151, write__2 153, and write__3 155. At systematic intervals, a commit data operation 162 writes the data in the database cache 160 out to a persistent database portion 164. Thus the data which was in the database cache 160 but intended for the persistent database portion 164 is faithfully transferred. Yet, the commit data operation is performed in a single step, as if the data intended for the persistent database portion 164 is coming from a single client. Thus the persistent database: portion 164 need only be maintained as a single client database, but has the advantages of a multiple client database. As should be apparent, this is done by storing the data from data write operations such as 151, 153, and 155 into the database cache 160. Then, after the data is committed to the persistent database portion 164 the data written by the objects in the earlier date write operations is stored permanently.

The database cache 160 is typically stored in transient memory such as RAM 34 and therefore provides an effective mechanism for objects to quickly write data out to the shared database. As will be appreciated by those skilled in the art, it is typically much faster to write to local memory such as RAM 34 then to a mass storage device such as mass storage 38. In one embodiment, the objects and/or the data write operations are unaware that two databases exist, essentially writing out to what is known as simply the database 159. In this sense, the database cache 160 "intercepts" all data write operations thereby freeing clients much quicker than if the data write operation wrote directly to a mass storage device. According to one aspect of the present invention, a time commit thread will manage both when clients can write to the database cache 160 and when data in the database cache 160 which is intended for the persistent database portion 164 is committed to the persistent database portion 164. In one specific embodiment, the time commit thread will (at systematic intervals) prevent any new data write operations, wait for any currently processing data write operations to conclude, and then transfer the data into the persistent database portion 164 by an operation commit data 162. Note that each of the data write operations write__1 151, write__2 153, and write__3 155 must be complete or the data in the database 159 will be inconsistent with the state of the clients of the database 159.

Organization and structure of the database 159 may be accomplished through a variety of different frameworks which are well familiar to those skilled in the art of database management. In one suitable embodiment the database 159 includes a log file (simply a log of changes) and a database file. The combination of a log file and a database file provides a mechanism which insures database consistency.

As will be apparent to those skilled in the art, one critical task in the implementation of the paradigm of FIG. 4 will be the effective coordination of memory management between the multiple threads competing for the resources of both the database cache 160 and the persistent database portion 164. These different threads will include the aforementioned time commit thread and any clients which wish to write into the database 159. As should be appreciated, the synchronization of a multi-threaded system is often a daunting task. The present invention teaches methods, apparatus, and data structures which provide a framework for solving the inherent synchronization challenge presented herein.

Synchronization objects, a common tool for synchronizing multithreaded systems, provide variables placed in shared memory which can be accessed by multiple processes and/or multiple threads. Thus different threads can synchronize in spite of the fact that they are typically unaware of one another's existence. Typical examples of synchronization variables include mutual exclusion locks (referred to hereinafter as mutexes), condition variables, reader/writer locks, and semaphores. Some advantages of using synchronization variables are (1) two or more processes can use a single synchronization variable jointly and (2) synchronization variables insure consistency of the shared data.

In explanation, a mutex is created to correspond to a piece of code, a portion of data, some state, etc. When a first thread locks a mutex, all other threads are prevented from executing the piece of code or accessing the portion of state corresponding to the mutex. When a thread has locked a mutex, it is said to "own" the locked mutex. In order for other threads to own the mutex, the first thread (i.e. the thread that locked the mutex) must unlock it. Thus mutexes provide a mechanism by which the programmer can control the serialization of multiple threads, ensuring that steps occur in a desired order and that the state corresponding to the mutex is maintained in a consistent manner.

Condition variables are used (typically in conjunction with a corresponding mutex) to atomically block threads until a specified condition is met. By way of example, a first thread may lock a mutex corresponding to a certain condition variable having a data structure which includes a true or false flag, thereby preventing all other threads from operating on this condition variable. The first thread may then evaluate the true or false flag, performing the desired action if the flag value is true. If the flag is false, the thread blocks on the condition flag and simultaneously releases the mutex. When the first thread blocks on the condition flag, it temporarily stops executing and waits for the condition flag to change. Then, when a second thread changes the condition flag, it may also broadcast a wakeup call to any threads (such as the first thread) waiting for a change in the condition. The first thread then wakes up owning the mutex (this is part of waking up) and must determine if the change in the condition flag merits an action or if it should go back to sleep. So the first thread reevaluates the condition flag and then, if the flag is true, it may perform the originally intended task. Of course the example of the true or false flag is simply a sample of what condition variables may be used to accomplish. In another important example, a thread may utilize a condition variable to assert a sleep timer, waking up in response to the sleep timer lapsing. Of course the thread may be woken up by other mechanisms as well.

In brief, typical operations which may be performed by a thread when it owns a mutex associated with a condition variable include evaluating a state of a variable, changing a state of the variable, asserting a wait for state to change command, asserting a wait for timer command, and waking up threads which are waiting for a change in state of this condition variable. These operations are available based on the nature of condition variables. Synchronization objects are discussed in more depth in the document "Multithreaded Programming Guide", 1994, published by SunSoft, which is incorporated herein by reference in its entirety.

In preferred embodiments, condition variables are utilized to coordinate the synchronization between clients of a database 159 and a time commit thread. Four specific condition variables in accordance with the present invention will now be discussed with reference to FIGS. 5–8.

Figure 5:
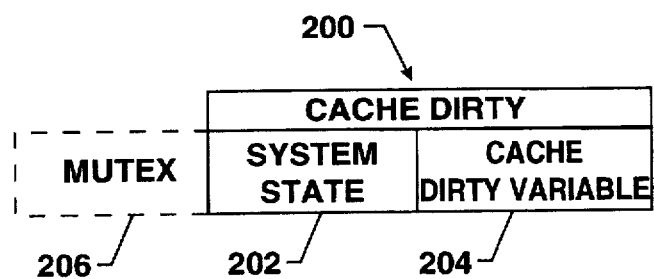
FIG. 5 is a pictorial illustration of a data structure for a cache dirty conditional variable in accordance with one embodiment of the present invention, the cache dirty conditional variable including system state, a cache dirty bit, and a corresponding mutex.

A data structure for a condition variable cache dirty 200 will be discussed first with reference to FIG. 5. The condition variable cache dirty 200 includes system state 202, a cache dirty variable 204, and a corresponding mutex, cache dirty mutex 206. In some embodiments, each process has a condition variable cache dirty 200 and all threads which use a single database 159 are found in a single process. However, in other embodiments, cache dirty 200 is resident in shared memory and thus may be used in a multi-process implementation. Those of skill in the art will be well familiar with the different forms of transport between computer entities residing in either same processes, different processes, or different computer systems. The cache dirty mutex 206 enables a first thread to essentially prevent other threads from changing or reading any state in the condition variable cache dirty 200 while the first thread owns the cache dirty mutex 206. The system state 202 includes the state required by the system to implement a condition variable as described above. As the functionality of condition variables is well known and a more detailed description is not particularly relevant to the present invention, no further discussion will be presented. The cache dirty variable 204 is a variable which serves to indicate if the database cache 160 contains data which needs to be committed to the persistent database portion 164. According to one embodiment of the present invention, write operations such as write_1 151 are responsible for setting the cache dirty variable 204. In turn, the time commit thread will check the state of the cache dirty variable 204 to determine if an operation commit data 162 is necessary. By way of example, the cache dirty variable 204 may be a variable which can have a state of either TRUE or FALSE. In one suitable embodiment, the cache dirty variable 204 is a bit set to a value of zero corresponding to a FALSE state, and a value of unity corresponding to a TRUE state.

Figure 6:
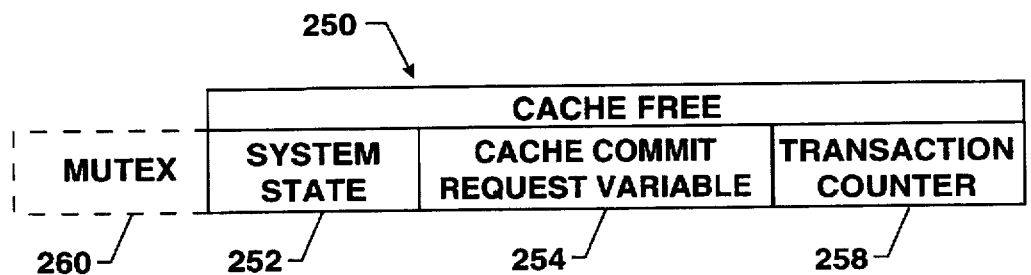
FIG. 6 is a pictorial illustration of a data structure for a cache free conditional variable in accordance with one embodiment of the present invention, the cache free conditional variable including system state, a cache commit request variable, a force abort variable, a transaction counter, and a corresponding mutex.

With reference to FIG. 6, a condition variable cache free 250 in accordance with one embodiment of the present invention will be described. The condition variable cache free 250 includes system state 252, a cache commit request variable 254, and a transaction counter 258. Additionally, the condition variable cache free 250 has a corresponding cache free mutex 260. The cache commit request variable 254 serves to indicate that the time commit thread is requesting an opportunity to perform a commit data operation 162. The transaction counter 258 is a counter variable which indicates the number of data write operations which are active.

The general flow of execution utilizing the condition variable cache free 250 in accordance with one embodiment of the present invention would go as follows. A first object requesting permission to write data to the database cache 160 would lock the cache free mutex 260 thereby protecting the condition variable cache free 250. Then, the object would evaluate the cache commit request variable 254. In the case that the cache commit request variable 254 is FALSE, the object would increment the transaction counter 258 by unity, unlock the cache free mutex 260, and then proceed with a data write operation. Then, when the data write operation is complete, the object would lock the cache free mutex 250, decrement the transaction counter 258, and unlock the cache free mutex 250.

In the case that the cache commit request variable 254 is TRUE, the object would simultaneously unlock the cache free mutex 250 and assert a wait on the condition variable cache free until the condition of the cache commit request variable 254 changes. Note that the time commit thread is executing concurrently with the clients of the database 159, and may be competing for access to the condition variables. Thus, when the time commit thread begins a commit data operation 162, it will lock the cache free mutex 260, set the cache commit request variable 254 to TRUE and evaluate the transaction counter 258. If the transaction counter has a value of zero, the time commit thread will perform the commit data operation 162, reset the cache commit request variable 254 to FALSE, and then unlock the cache free mutex 260. On the other hand, if the transaction counter 258 has a nonzero value, the time commit thread will go into a wait state, simultaneously unlocking the cache free mutex 260, as described below with respect to FIG. 7.

Figure 7:
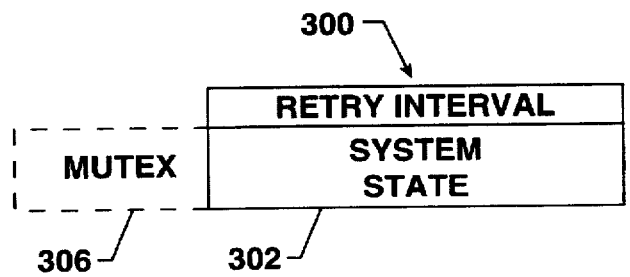
FIG. 7 is a pictorial illustration of a data structure for a retry interval conditional variable in accordance with one embodiment of the present invention, the time commit condition variable including system state and a corresponding mutex.

FIG. 7 shows a data structure for a condition variable retry interval 300 in accordance with one embodiment of the present invention. The condition variable retry interval 300 includes system state 302 and a corresponding retry interval mutex 306. Following directly from the above discussion of FIG. 6, when the transaction counter 258 has a nonzero value, the time commit thread must wait for the transaction counter 258 to go to zero (i.e. all the data write operations complete). In one suitable method for enabling this wait, the time commit thread locks the retry interval mutex 306, and simultaneously (1) asserts a wait for a predetermined time to wake up and (2) unlocks the retry interval mutex 306. The predetermined time may vary according to the implementation. By way of example, a twenty second wait period has been found to work well. Then, when the predetermined time passes, the time commit thread wakes up in possession of the cache free mutex 260, evaluates the transaction counter 258, and then unlocks the cache free mutex 260. Thus the time commit thread will periodically continue to evaluate the transaction counter 258 and wait until its value becomes zero.

Figure 8:
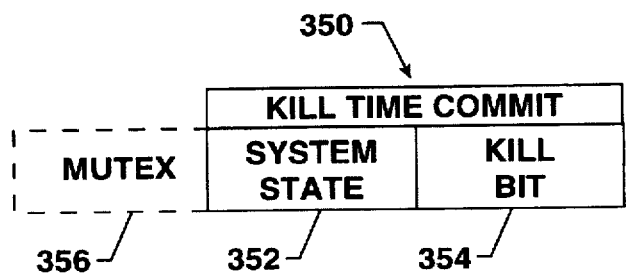
FIG. 8 is a pictorial illustration of a data structure for a kill time commit conditional variable in accordance with one embodiment of the present invention, the kill time commit conditional variable including system state, a kill time commit bit, and a corresponding mutex.

FIG. 8 shows a condition variable kill time commit 350 in accordance with one embodiment of the present invention. The condition variable kill time commit 350 includes system state 352, a kill bit 354, and a corresponding kill time commit mutex 356. The condition variable kill time commit 350 is used to initiate termination of execution of the time commit thread. The time commit thread may terminate execution for reasons such as system shutdown or maintenance to the database 159. Thus, at any suitable time, the time commit thread will lock the kill time commit mutex 356, evaluate the kill bit 354 and then unlock the kill time commit mutex 356. If the kill bit 354 is FALSE, then the time commit thread simply proceeds executing. However, if the kill bit 354 is TRUE, the time commit thread begins a cleanup process which results in the termination of the time commit thread. One suitable embodiment of a cleanup process is discussed below with respect to FIG. 12. Note that in the above discussion of FIGS. 5–7 there were multiple instances when the time commit thread went into a wait state. In one embodiment of the present invention, each of these instances would include an initial wake up step of evaluating the kill bit 354.

A state diagram illustrating some of the possible states for a time commit thread and their correspondence to the states of the condition variables discussed immediately above with reference to FIGS. 5–8 will be discussed now with reference to FIG. 9. As will be appreciated by those of skill in the art, state diagrams are useful for gaining insight into process execution but do not necessarily exhaustively define the process diagrammed. For example, a given entity may have more than one state diagram, each diagram being accurate in its own way. In addition, a completely thorough state diagram may (through too many details) obscure the information which it is trying to convey. In light of this, the state diagram of FIG. 9 and the following description are not to be interpreted as fully encompassing all possible states and/or transitions that a time commit thread in accordance with the present invention may exhibit. Therefore, the state diagram of FIG. 9 should in no way be construed as limiting, but rather is presented to explain the present invention.

Figure 9:
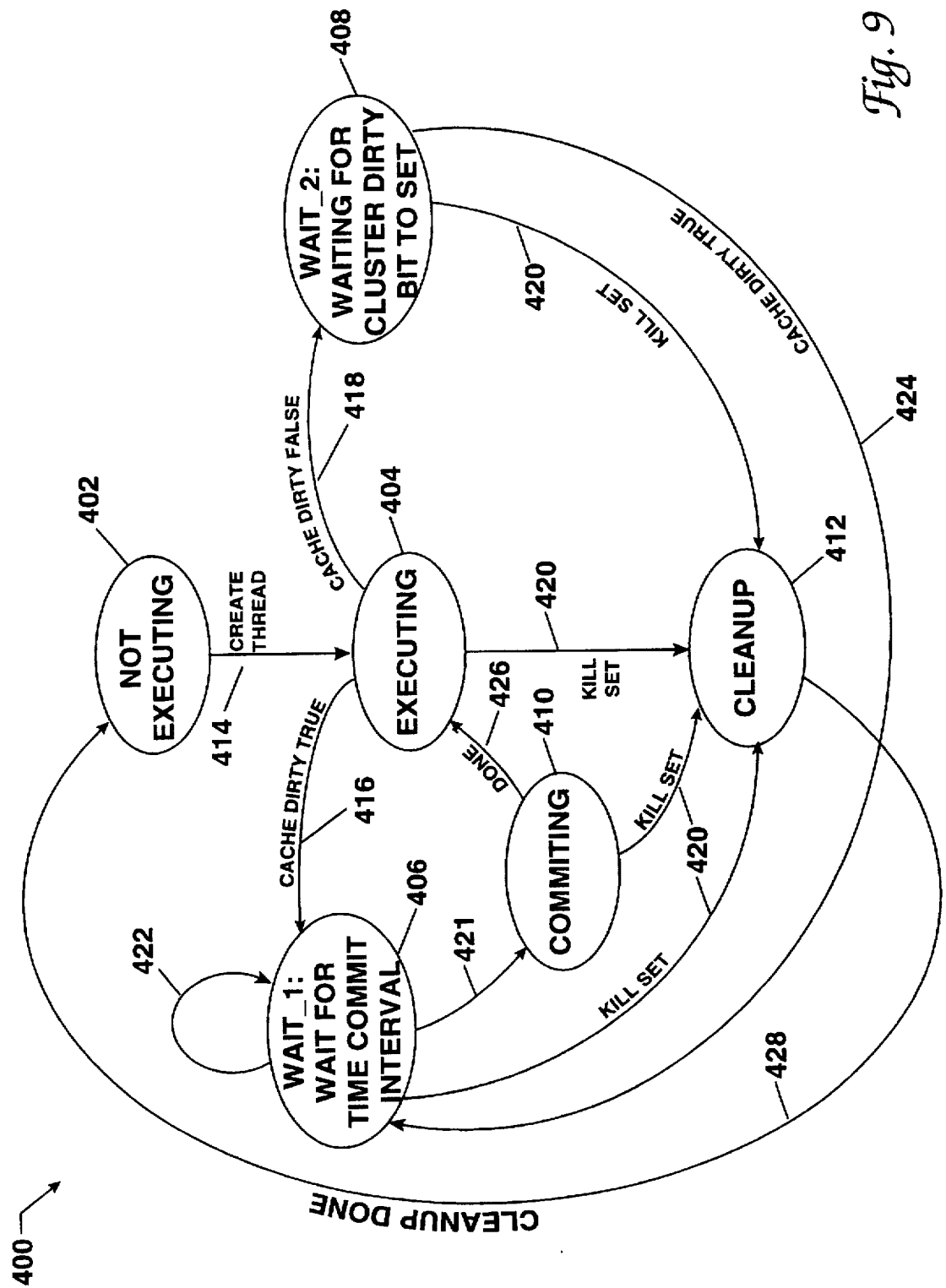
FIG. 9 is a state diagram illustrating some of the possible states for a time commit thread in accordance with one embodiment of the present invention.

The time commit state diagram 400 of FIG. 9 includes the states not executing 402, executing 404, wait_1 406, wait_2 408, committing 410, and cleanup 412. The state not executing 402 corresponds to the time commit thread effectively not existing. However, even though the time commit thread of execution does not exist, there may be executable code and state stored in persistent memory which relate to the time commit thread. Then, after a transition create thread 414, the time commit thread will be in the state executing 404. Executing 404 includes various operations not shown as other states in this diagram such as locking the cache dirty mutex 260, evaluating the cache dirty variable 204, etc. A first way the time commit thread can change states from executing 404 is on a transition cache dirty true 416. The transition cache dirty true 416 occurs if the cache dirty variable 204 is (or becomes) TRUE. In this first case, the time commit thread will change to state wait_1 406, which will be discussed immediately following the discussion of the state executing 404. The time commit thread may also change from executing 404 to a state wait_2 408 via a transition cache dirty false 418. The transition cache dirty false 418 occurs when the cache dirty variable 204 is FALSE. The state wait_2 408 will be discussed immediately following the discussion of wait_1 406. In addition, the time commit thread can change from executing 404 to a state cleanup 412 on a transition kill set 420. The transition kill set 420 occurs if the kill set bit 354 is TRUE. The state cleanup 412 will be discussed immediately following the discussion of committing 410.

The state wait_1 406 corresponds to the time commit thread waiting for an interval to pass before reevaluating the transaction counter 258. Of course, if the transaction counter equals zero, the time commit thread may skip wait_1 406 and go directly to committing 410. Thus, prior to entering wait_1 406 or immediately after a retry interval has passed, the time commit thread will evaluate the transaction counter 258. If the transaction counter is zero, then in a transition transaction counter=0 421, the time commit thread changes to committing 410. However, if the transaction counter is not zero, than in a transition transaction counter≠0 422, the time commit thread reenters wait_1 406. One third way the time commit thread can change from wait_1 is on a transition kill set 420. The transition kill set 420 occurs if the kill bit 354 is TRUE. In this third case, the time commit thread will change to a state cleanup 412.

The state wait_2 corresponds to the commit thread waiting indefinitely for the cache dirty variable 204 to become true. When the cache dirty variable 204 becomes TRUE, the time commit thread changes, on a transition cache dirty true 424, to wait_1 406. However, if the kill set bit 354 is TRUE, then the time commit thread will change from wait_2 408 on a transition kill set 420.

The state committing 410 corresponds to the time commit thread performing a data commit operation. When the data commit operation is done, the time commit thread may change, on a transition commit done 426, back into executing 404. However, if the kill bit 354 is TRUE, then the time commit thread will change from wait_2 408 on a transition kill set 420.

The state cleanup 412 corresponds to the time commit thread preparing an orderly shutdown. Note that cleanup 412 transitions to only the state not executing 402 by the transition cleanup done 428. Furthermore, cleanup is the mandatory state which must be entered into whenever the kill bit 354 is set. This is regardless of the values of the other condition variables. In some embodiments the time commit thread will notify the shutdown thread when it has noticed that the kill bit is set and then terminate its own execution. In these embodiments, the shutdown thread is responsible for completing any remaining cleanup tasks.

Figure 10:
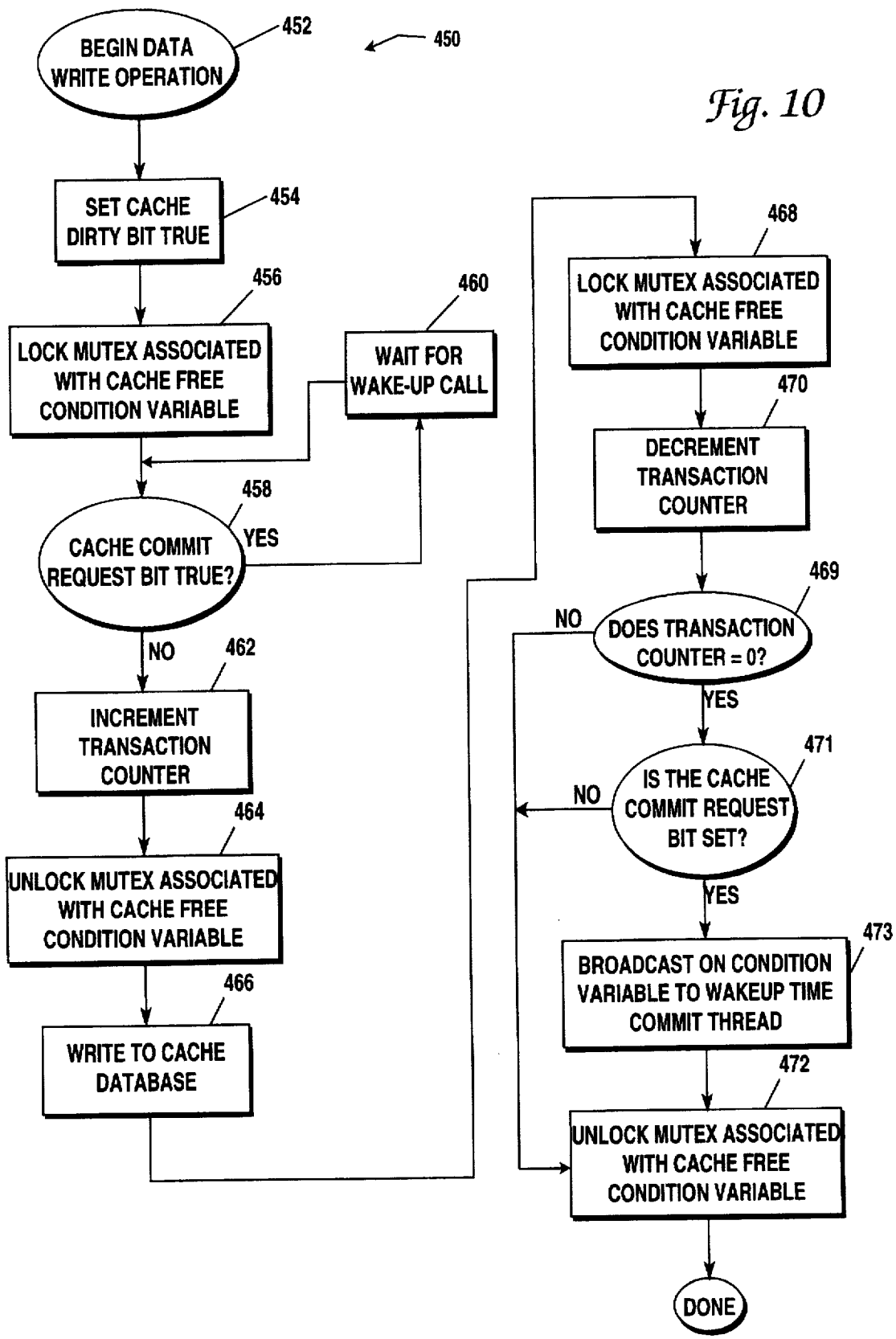
FIG. 10 is a flow chart illustrating a few paths of a thread of execution for a client of a database performing a data write operation in accordance with one embodiment of the present invention, wherein the data write operation writes data to the database cache.

A method 450 for an object to write to a database cache 160 in accordance with one embodiment of the present invention will now be discussed with reference to FIG. 10. As will be appreciated by those of skill in the art, this method can be modified within the scope of the present invention so that a variety of clients of the database cache 160 may write using this method. For example, the method 450 may be implemented by the object development framework of a distributed object operating environment such that objects designed to utilize a database 159 may do so transparently, that is, without their own internal overhead. One suitable embodiment for doing this is described in Hapner's copending U.S. patent application Ser. No. 08/414,770 entitled "METHODS AND APPARATUS FOR PROVIDING TRANSPARENT PERSISTENCE IN A DISTRIBUTED OBJECT OPERATING ENVIRONMENT", which is incorporated herein by reference in its entirety. In a first step, begin object write operation 452, the object starts a data write operation 151. Then, in step 454, the object will set a cache dirty variable 204 to a value TRUE. Step 454 may include steps such as locking a cache dirty mutex 206, setting the cache dirty variable 204, and unlocking the cache dirty mutex 206. Additionally, the object write operation 452 may assert a wakeup broadcast to all sleeping threads waiting for a change in the condition of the cache dirty variable 204. For example, step 506 of FIG. 11 responds to such a wakeup call as will be described in more detail later.

After the cache dirty variable 204 has been set, the method continues in a step 456 where the object locks a cache free mutex 260. Once this mutex is locked, the object can evaluate and/or change elements of the condition variable cache free 250 without another entity changing the values inside the condition variable cache free 250. Once the cache free mutex 260 is locked, the object evaluates the cache commit request variable 254. In the case where the cache commit request variable 254 is TRUE, the object, in a step 460, simultaneously asserts a wait for wakeup command and unlocks the cache free mutex 260. This wakeup call will come when a thread changing a value in condition variable cache free 250 asserts a wakeup all waiting threads broadcast.

Still further in step 460, when the object receives a wakeup call, it wakes up in possession of the cache free mutex 260 and then (re)evaluates the cache commit request variable 254. Thus in the embodiment of FIG. 10, the object will cycle between waiting and evaluating the cache commit request variable 254 until this variable becomes FALSE. When the cache commit bit request bit 254 becomes false, the object, in a step 462, increments a transaction counter 258 and then in a step 464 unlocks the cache free mutex 464. After unlocking the cache free mutex 260, the object can write to the database cache in a step 466. Thus other threads can access the condition variable cache free 250 while the object is writing to the database cache 160.

When the object is finished writing in step 466, it will lock the cache free mutex 260 in a step 468 and then decrement the transaction counter 258 in a step 470. Thus the transaction counter 258 will contain a value which is consistent with the number of transactions occurring with the database cache 160. After decrementing the transaction counter in step 468, the data write operation will determine if the transaction counter 258 is now zero. If the transacation counter 258 is not zero (that is, there are still active data write operations) then the data write operation will unlock the cache free mutex 260 in a step 472. Once the object has unlocked the cache free mutex 260 in step 472, the data write operation is complete in step 474. However, when the there are no active data write operations, the data commit operation of method 450 will, in a step 471, determine if the cache commit request bit is set to indicate that the time commit thread wishes to perform a data commit operation. If the cache commit request bit is not set, then control proceeds to the unlock mutex step 472. If the cache commit request bit is set, then in a step 473, the data write operation will broadcast on a condition variable associated with the cache commit request bit, thereby waking up any threads which have blocked on the condition variable. Specifically, if the time commit thread has set the commit request bit, then the time commit thread is waiting to be woken, and in response to the broadcase, the time commit thread will wake up in possession of the mutex. In conjunction with the broadcast step 473, the data commit thread will correspondingly unlock the mutex associated with the cache free condition variable in a step 472.

Figure 11:
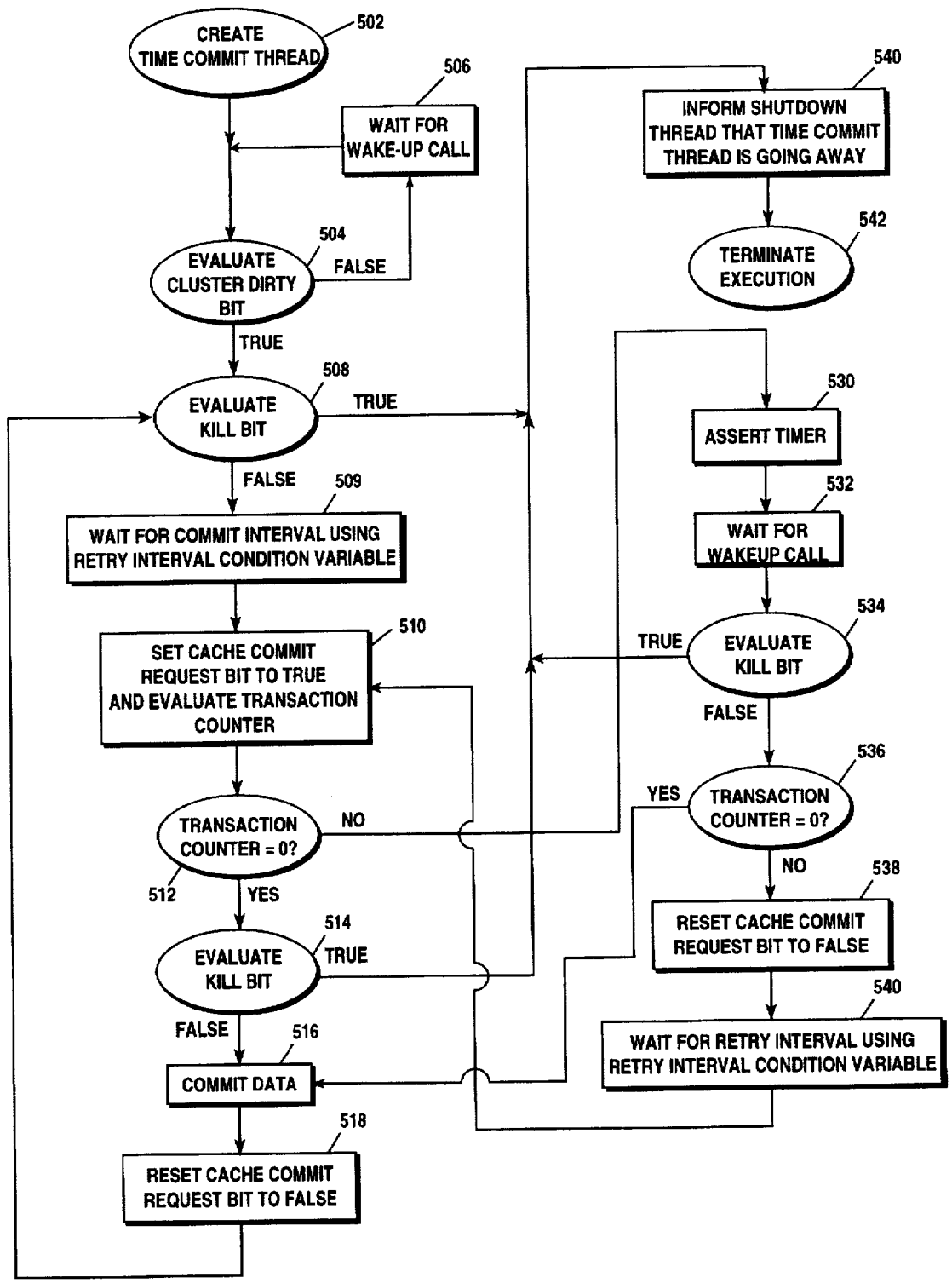
FIG. 11 is a flow chart illustrating a few paths of a thread of execution for a time commit thread performing a data commit operation in accordance with one embodiment of the present invention, wherein the time commit thread may commit data to the persistent database or cleanup and terminate execution.

Turning next to FIG. 11, a method for committing data to a persistent database portion according to one embodiment of the present invention will be described. Initially, the time commit thread is not active and must be activated. However, it should be appreciated that the flowchart of FIG. 11 is one possible embodiment for the time commit thread of execution. In other methods of the invention, the time commit thread is already executing. In any event, in a step 502, the time commit thread is created. Upon starting, in an initial step 504, the time commit thread evaluates a cache dirty variable 204. Step 504 includes steps such a locking a cache dirty mutex 206, evaluating the cache dirty variable 204, and then unlocking the cache dirty mutex 206. If the cache dirty mutex 206 is not free initially, the time commit thread waits until this mutex is released and then performs step 504. If the cache dirty variable is FALSE, then, in a step 506, the time commit thread asserts a wait for wakeup call command and then wakes up in possession of the cluster dirty mutex 206 and performs step 504 as described previously in this paragraph. In further embodiments, the time commit thread may evaluate a kill bit 354 prior to step 504 and initiate an orderly shutdown if the kill bit 354 is TRUE.

If the cache dirty variable 204 is TRUE, then the time commit thread will perform a commit data operation. Prior to doing this, however, the time commit thread may first verify that it is an appropriate time to perform the commit data operation. Thus, in a step 508, the time commit thread evaluates the kill bit 354. Step 354 may include steps such as locking a kill time commit mutex 356, evaluating the kill bit 354, and unlocking the kill time commit mutex 356. As discussed previously, the kill bit 354 can be set by another thread for the purpose of imposing an orderly shutdown on the time commit thread. Suitable reasons for imposing this shutdown include system shutdown, process shutdown, or maintenance operations on the time commit thread code and/or state.

Traveling down the FALSE branch of step 508, in a step 509, the time commit thread waits for a commit interval using the condition variable retry interval 300. In preferred embodiments the commit interval can be set according to the application. By way of example, a time commit interval of twenty seconds has been found to work well. Next, in a step 510, the time commit thread sets a cache commit request variable 254 to TRUE and then evaluates a transaction counter 258. Step 510 may include steps such as locking a cache free mutex 260, reading the value of the cache commit request bit 254, and unlocking the cache free mutex 260. Then, in a step 512, the time commit thread determines if the transaction counter 258 is zero. The value in the variable transaction counter 258 corresponds to the number of pending data write operations. If there are no pending data write operations, control proceeds down the YES branch of step 512 to a step 514 wherein the kill bit 354 is (once again) evaluated. As discussed previously, if the kill bit 354 is set then the time commit thread proceeds with cleanup. However, if the kill bit is FALSE in step 514, control proceeds down the FALSE branch of step 514 to a step 516. In step 516, the time commit thread commits the data present in the database cache 160 into the persistent database portion 164. In some embodiments, the time commit thread may initialize the database cache 160 in preparation for more data write operations. In any event, once the database cache 160 has been committed to persistent database portion 164, a step 518 resets the cache commit request variable 254 to FALSE. In order to perform this operation, step 518 may include the steps of locking the cache free mutex 260, setting the cache commit request variable 254 to FALSE, calling all threads which are waiting on a cache free 250 variable condition to change (e.g. objects waiting to perform data write operations but are blocked on the cache commit request variable 254), and unlocking the cache free mutex 260. Once step 518 is complete, the time commit thread waits for a commit interval using the retry interval 300 and then repeats the commit data cycle of FIG. 11 by returning execution control to step 504.

Traveling across the NO branch of step 512 (i.e. there are still data write operations pending), the time commit thread asserts a pending write completion timer using the condition variable cache free 250 in a step 530. Once the timer is asserted, the time commit thread waits for the timer to lapse in a step 532. It may be advantageous to have this timer be significantly shorter than the timer utilized between commit requests. For example, if the period between commit requests is twenty seconds, then a wait period of one second may be suitable. In some embodiments, when the time commit thread is woken up, it may not necessarily know why it has been woken up. Therefore, in a next step 534, the time commit thread evaluates the kill bit 354 in the same manner as discussed above with respect to step 508. In the event that the kill bit 354 is FALSE, the time commit thread flow of execution will proceed to step 536. In step 536 the time commit thread determines if the transaction counter 258 is zero. Note that the time commit thread may not know for certain why it was woken and therefore must verify that there are no pending data write operations. If there are no pending data write operations, control proceeds across the YES branch of step 536 to step 516 where the commit data operation is performed.

However, if the pending write interval discussed above with respect to steps 530 and 532 has expired and there are still pending data write operations, control goes down the NO branch of step 536 to a step 538 wherein the cache commit request bit is set to FALSE. The cache commit bit is reset in order to both (1) minimize the amount of time the time commit thread blocks database clients and (2) to avoid a deadlock. A deadlock would occur in a situation wherein a first database client having a pending data write operation required a response from a second database client which was in turn attempting to access the database. The second client would be unable to access the database and thus the first client would never complete its data write operation. In any event, after step 538, in a step 540, the time commit thread waits for a retry interval using the retry interval condition variable 300. The retry interval should provide a reasonable amount of time to allow any pending data write operations to finish. For example, a retry interval of 10 seconds has been found to work well. Following the retry interval control proceeds back to step 512 and the time commit thread will attempt again to perform the data commit operation through the previously described steps.

In the event that the kill bit 354 is set, the time commit thread executes the TRUE branch of either step 508, 510, and 534 and the time commit thread will proceed with cleanup in a step 540. Note that at any point in the execution of the time commit thread it may evaluate the kill bit 354 and if it is TRUE the execution of the time commit thread may proceed with cleanup in step 540. In preferred embodiments, step 540 informs the shutdown thread that the time commit thread has completed any pending operations and is going away. In turn, the shutdown thread performs the steps necessary for orderly shutdown, these step primarily concerned with maintaining the accuracy and consistency of the persistent database portion 164. However, in other embodiments the time commit thread performs its own orderly shutdown. One method for shutdown in accordance with one embodiment of the present invention is described in more detail below with respect to FIGS. 12 and 13. Nevertheless, once step 540 is done, the time commit thread terminates execution in a step 542. After step 542, the operations of the time commit thread are completely stopped. Of course, another entity may perform the create thread of step 502, starting the time commit thread all over again.

Figure 12:
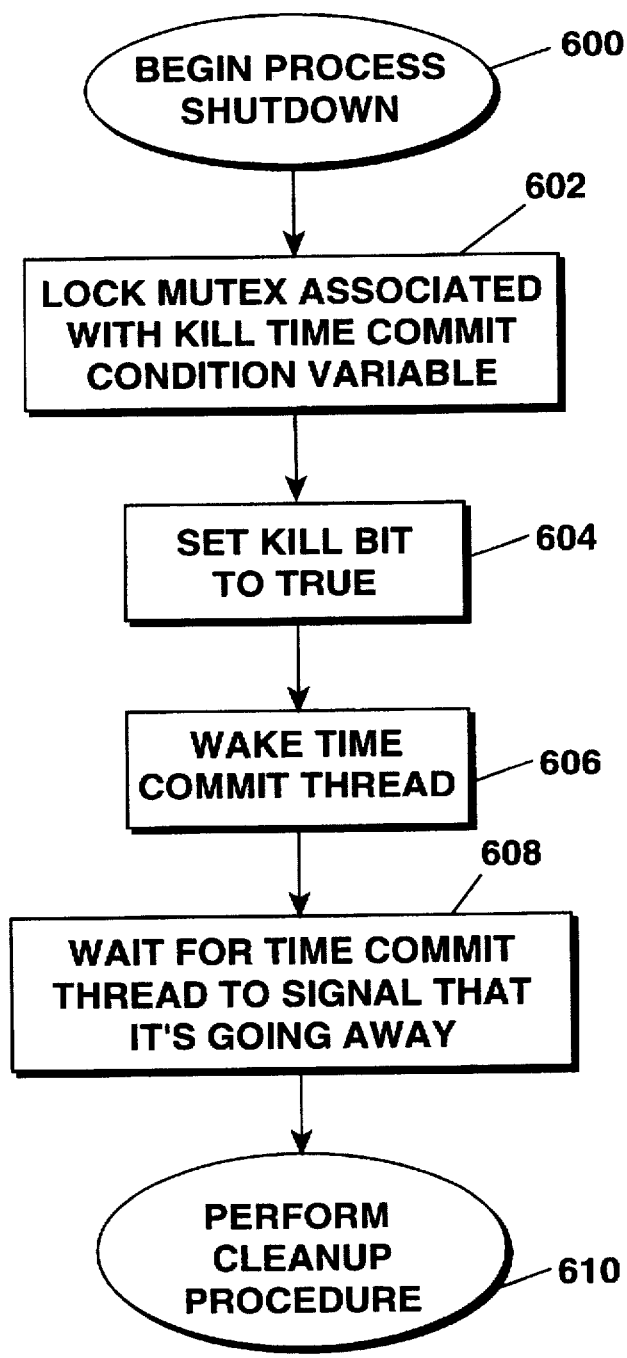
FIG. 12 is a flow chart illustrating a path of a shutdown thread of execution for a system shutdown in accordance with one method aspect of the present invention.

One method for a process shutdown thread of execution to shutdown the time commit thread in accordance with the present invention will be discussed now with reference to FIG. 12. In a first step 600, the operating system of a computer on which a time commit thread is executing begins a process shutdown procedure. Step 600 may be in response to various operations such as a power down request from a user or the process under which the time commit thread is executing may be going away. The step 600 may include additional steps which the operating system wishes to perform prior to shutting down the time commit thread. One suitable step may be the completion of all data write operations being performed by clients of a persistent database portion 164 (i.e. the clients are writing to the database cache). In any event, after step 600 is completed, the operating system is prepared for the shutdown of the time commit thread. Next, in a step 602, the shutdown thread locks a kill time commit mutex 356. By locking the kill time commit mutex 356 the shutdown thread is insured that no other threads will attempt to read or write to a condition variable kill time commit 350. Once the kill time commit mutex 356 is locked in a step 604 the shutdown thread sets a kill bit 354 to TRUE, thereby indicating a request for the time commit thread to proceed with a cleanup and orderly shutdown. Thus, in order to provoke the time commit thread cleanup and orderly shutdown, the shutdown thread, in a step 606, wakes up the time commit thread. One embodiment of the database cleanup will be discussed in more detail below with respect to FIG. 13. Of course the time commit thread may not be asleep, and in that case step 606 is redundant yet not harmful. Then, in a step 608, the shutdown thread unlocks the kill time commit mutex 356. After the kill time commit mutex 356 is unlocked, the time commit thread can access the kill bit 354 (which it inevitably does at some point after being woken).

Once steps 602-608 are completed, in a step 610 the shutdown thread can continue performing all other appropriate shutdown procedures. In particular, the shutdown thread performs a database cleanup procedure. One suitable method for a database cleanup is described in more detail below with reference to FIG. 13. As will be appreciated by those skilled in the art, the thread responsible for steps 602-608 of FIG. 10 may be one of many shutdown threads executing the system shutdown. Thus, other system shutdown procedures may be occurring concurrently with the procedure of FIG. 12. Hence the thread of FIG. 12 may simply terminate executing in step 610 as other threads may be responsible for the other shutdown procedures.

Figure 13:
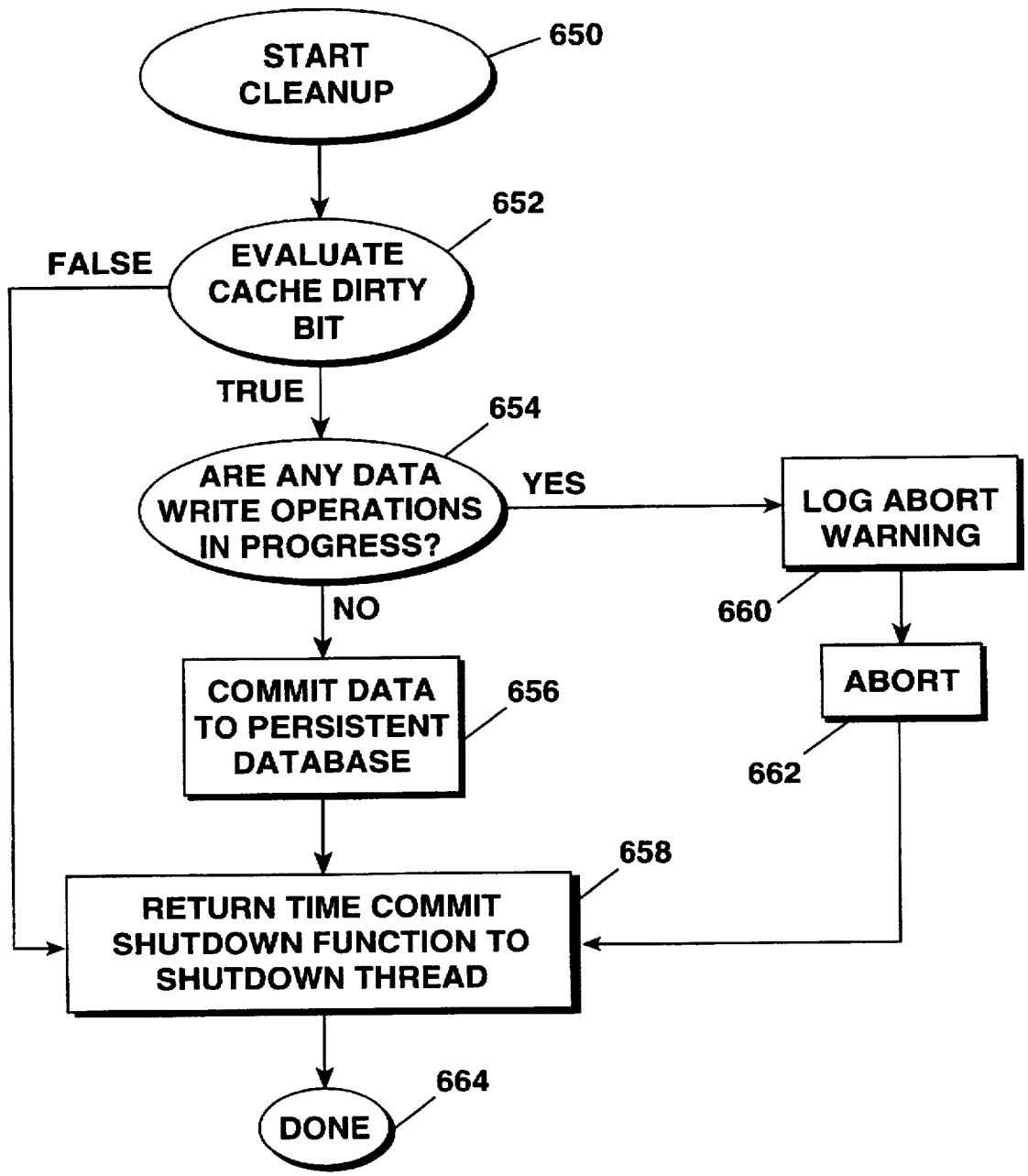
FIG. 13 is a flow chart illustrating a few paths of a thread of execution for a shutdown thread performing a cleanup and an orderly shutdown in accordance with another method aspect of the present invention.

One method for a database cleanup in accordance with the present invention will be described now with reference to FIG. 13. In the method of FIG. 13, it is assumed that the time commit thread has evaluated a kill bit 354, determined that a cleanup has been requested, notified the shutdown thread that the time commit thread is terminating, and then self-terminated. Thus an initial step 600, start cleanup, may include any steps which bring the shutdown thread into the cleanup, method of FIG. 13. Typically this is simply the step of determining that the kill bit 354 is TRUE. So, in a first substantive step 652, the shutdown thread will evaluate a cache dirty variable 204. Step 652 may include steps such as locking a cache dirty mutex 206, reading the cache dirty variable 204, and unlocking the cache dirty mutex 206.

Traveling down the TRUE branch of step 652 (i.e. the cache dirty variable 204 is set), the shutdown thread determines in a step 654 if there are any pending data write operations. Step 654 may include steps such as locking the cache free mutex 260, checking to see if a transaction counter 258 is zero (i.e. there are no active data write operations), setting a cache commit request variable 254 to TRUE, and unlocking the cache free mutex 260. If it is determined that no data write operations are active, then in a step 656 the shutdown thread will commit the data stored in the database cache to the persistent database portion. In this case, none of the data write operations are lost and the persistent database portion consistency is maintained. After performing the commit data operation, in a step 658 the shutdown function will return to its caller, the shutdown thread.

If it is determined in step 654 that there are active data write operations (e.g. the transaction counter 258 is nonzero), then, in a step 660, the shutdown thread logs an abort warning. This warning serves notice to the users that all active data write operations that they will be aborted and none of the data they are writing will be committed to the persistent database portion 164. This ensures consistency between the database clients and the persistent database portion. After the abort warning has been logged, a step 662 aborts all the active data write operations. In the embodiment of FIG. 13, the abort of step 662 leaves inconsistent data in a database cache 162. Therefore, immediately following the abort of step 662, the shutdown thread executes step 658. Note that a commit data step such as step 656 is not performed. This ensures consistency between the database clients and the persistent database portion 164. However, in some embodiments step 662 includes deleting the partial data written into database cache 160 or other steps which will ensure consistency between the database clients and the persistent database portion 164. In this situation, the shutdown thread may execute a commit data step such as step 656 following the abort of step 652.

Returning to step 652, if it is determined that the cache dirty bit 204 is FALSE, then the shutdown thread can immediately proceed to return to its caller in step 658. In any event, once step 658 is done, the shutdown function terminates cleanup in a step 664.

In preferred embodiments of the present invention, the methods and apparatus will be constructed and implemented during both development of the database clients and runtime. This will be done such that the methods and apparatus are transparent to the clients. For example, an Object Development Framework (ODF) will provide the programming model for developing distributed objects for use in a distributed object operating environment. ODF will provide an automatic and transparent mechanism for object developers to incorporate into their objects the mechanism which will provide the persistence strategy of the present invention with little effort to the object developer. One suitable ODF is described in Snyder et. al.'s copending U.S. patent application Ser. No. entitled "METHOD AND APPARATUS FOR GENERATION AND INSTALLATION OF DISTRIBUTED OBJECTS ON A DISTRIBUTED OBJECT SYSTEM" which is incorporated herein by reference in its entirety.

Although only a few embodiments of the present invention have been described, it should be understood that the present invention may be embodied in many other specific forms without departing from the spirit or scope of the invention. For example, other mechanisms for synchronizing threads of execution are contemplated. One instance would utilize read/write synchronization objects rather than condition variables and mutexes. In this instance, the variables in shared memory could be read concurrently by different threads but only one thread at a time could write to the shared variables. The modifications necessary to implement the present invention using read/write synchronization objects will be apparent to those skilled in the art of concurrent programming.

In other embodiments, a database 159 would include a database cache 160 located on a first computer system and a persistent database portion 164 located on a second computer system. Thus the data commit operations would include transmitting data across a network. Expanding on this further, in another embodiment, a single database would be implemented on a plurality of computer systems such that a single computer system holds the persistent database portion, and each of the computer systems has its own database cache. In this embodiment, clients of the database would take turns writing to the database cache resident on their host computer system and in turn these database caches would commit data to the database cache located on the computer system which hosts the persistent database portion.

Furthermore, the methods and apparatus of the present invention are well suited for use by a multiplicity of objects as a persistent storage manager. That is, the strategies of the present invention may be used to provide persistent state for persistent objects. In some embodiments, the methods and apparatus of the present invention may be used to provide transparent persistence to objects. By transparent persistence it is meant that the object developer does not program their own persistence strategy. For more details regarding transparent persistence, please see Hapner et. al.'s copending U.S. patent application Ser. No. 08/414,270 entitled "METHODS AND APPARATUS FOR PROVIDING TRANSPARENT PERSISTENCE IN A DISTRIBUTED OBJECT OPERATING ENVIRONMENT" which is incorporated herein by reference in its entirety.

Therefore, the present examples are to be considered as illustrative and not restrictive, and the invention is not to be limited to the details given herein, but may be modified within the scope of the appended claims.

We claim:

1. A computer system for use in a distributed object operating environment, said computer system comprising:
   a central processing unit;
   transient memory including random access memory;
   persistent memory including a mass storage device; and
   a database including:
   a transient database cache resident in said transient memory, said transient database cache being arranged to receive and store client data via data write operations performed by a plurality of database clients; and
   a persistent database portion resident in said persistent memory, said persistent database portion being arranged to receive and store cache data via data commit operations, said data commit operation being operable to commit said client data from said transient database cache.

2. A computer system as described in claim 1 further including a computer process executing on the computer system, said transient database cache being resident within said computer process.

3. A computer system for use in a distributed object operating environment, said computer system comprising:
   a central processing unit;
   transient memory including random access memory;
   persistent memory including a mass storage device;
   a database including:
   a transient database cache resident in said transient memory, said transient database cache being arranged to receive and store client data via data write operations performed by a plurality of database clients; and
   a persistent database portion resident in said persistent memory, said persistent database portion being arranged to receive and store cache data via data commit operations, said data commit operation being operable to commit said client data from said transient database cache to said persistent database portion as if the data intended for the persistent database is coming from a single client.
   a computer process executing on the computer system, said transient database cache controlled within said computer process; and
   a cache dirty condition variable resident in said computer process, said cache dirty condition variable having a cache dirty variable and a cache dirty mutex.

4. A computer system as described in claim 3 further including:
   a cache dirty lock mechanism for locking and unlocking said cache dirty mutex; and
   a cache dirty setting mechanism for setting and resetting said cache dirty variable, wherein setting said cache dirty variable indicates that data which is intended for said persistent database portion is resident in said transient database cache.

5. A computer system for use in a distributed object operating environment, said computer system comprising:
   a central processing unit;
   transient memory including random access memory;
   persistent memory including a mass storage device;
   a database including:
   a transient database cache resident in said transient memory, said transient database cache being arranged to receive and store client data via data write operations performed by a plurality of database clients; and a persistent database portion resident in said persistent memory, said persistent database portion being arranged to receive and store cache data via data commit operations, said data commit operation being operable to commit said client data from said transient database cache to said persistent database portion;

a computer process executing on the computer system, said transient database cache controlled within said computer process; and a cache free condition variable resident in said computer process, the cache free condition variable having a cache free mutex, a cache commit request variable, a force abort variable, and a transaction counter.

6. A computer system as described in claim 5 further including:

a cache free lock mechanism for locking and unlocking said cache free mutex;

a cache free setting mechanism for setting and resetting said cache commit request variable, wherein setting said cache commit request variable indicates that a data commit operation is in process; and an arithmetic device for incrementing and decrementing said transaction counter by a predetermined number, wherein the value of said transaction counter is indicative of the number of active data write operations.

7. A computer system for use in a distributed object operating environment, said computer system comprising:

a central processing unit;

transient memory including random access memory;

persistent memory including a mass storage device;

a database including:

a transient database cache resident in said transient memory, said transient database cache being arranged to receive and store client data via data write operations performed by a plurality of database clients; and a persistent database portion resident in said persistent memory, said persistent database portion being arranged to receive and store cache data via data commit operations, said data commit operation being operable to commit said client data from said transient database cache to said persistence database portion as if the data intended for the persistence database is coming from a single client.

a computer process executing on the computer system, said transient database cache controlled within said computer process; and a kill time commit condition variable having a kill time commit mutex and a kill bit.

8. A computer system as described in claim 7 further including:

a kill lock mechanism for locking and unlocking said kill time commit condition mutex; and a kill set mechanism for setting and resetting said kill bit, wherein setting the kill bit indicates that a time commit thread cleanup is requested.

9. A computer system for use in a distributed object operating environment, said computer system comprising:

a central processing unit;

transient memory including random access memory;

persistent memory including a mass storage device; and a database including:

a transient database cache resident in said transient memory, said transient database cache being arranged to receive and store client data via data write operations performed by a plurality of database clients; and a persistent database portion resident in said persistent memory, said persistent database portion being arranged to receive and store cache data via data commit operations, said data commit operation being operable to commit said client data from said transient database cache to said persistent database portion as if the data intended for the persistent database is coming from a single client.

a database client operable to write certain data to said transient database, said certain data intended to be maintained persistently in said database.

10. A computer system as described in claim 9 wherein said database client is resident in said computer process.

11. A computer system as described in claim 10 wherein said database client is an object.

12. A distributed object operating environment comprising:

a plurality of computer systems, each of said computer systems including:

a central processing unit;

transient memory including random access memory;

persistent memory including a mass storage device; and a database including:

a transient database cache resident in said transient memory, said transient database cache being arranged to receive and store client data via data write operations performed by a plurality of database clients; and a persistent database portion resident in said persistent memory, said persistent database portion being arranged to receive and store cache data via data commit operations, said data commit operation being operable to commit said client data from said transient database cache; to said persistent database portion as if the data intended for the persistent database is coming from a single client; and a computer network interconnecting said plurality of computer systems.

13. A computer implemented method for performing a data write operation to a transient database cache portion of a database being intended to reside in a computer system, the database further including a persistent database portion, the database operable to maintain data persistently for a plurality of database clients, the method including the computer controlled steps of:

setting a cache dirty variable to a state that indicates that the transient database cache contains data which is intended for the persistent database portion;

incrementing by a predetermined value a transaction counter, the transaction counter indicating the number of active data write operations;

writing the data intended for the persistent database portion to the transient database cache after the transaction counter incrementing step, the data being written into the cache by a one of said plurality of database clients, said transient database cache operable to simultaneously store data received from multiple write operations; and decrementing the transaction counter by the predetermined value in conjunction with the data writing step.

14. A computer implemented method as recited in claim 13 wherein the cache dirty variable is one element of a condition variable cache dirty which further includes a corresponding cache dirty mutex, the method further including the computer controlled steps of:

locking the cache dirty mutex prior to the step of setting the cache dirty variable; and unlocking the cache dirty mutex after the step of setting the cache dirty variable.

15. A computer implemented method as recited in claim 13 wherein the transaction counter is an element of a condition variable cache free which further includes a cache commit request variable and a corresponding cache free mutex, the method further including the computer controlled steps of:

locking the cache free mutex prior to the transaction counter incrementing step;

determining a state of the cache commit request variable after the step of locking the cache free mutex;

prior to the transaction counter incrementing step, waiting in a sleep state when the state of the cache commit request variable indicates that a cache commit operation is active, wherein the waiting step terminates upon the transition of the state of the cache commit request variable;

unlocking the cache free mutex in conjunction with the transaction counter incrementing step.

16. A computer implemented method as recited in claim 15 further including the computer controlled steps of:

locking the cache free mutex prior to the transaction counter decrementing step; and unlocking the cache free mutex in conjunction with the transaction counter decrementing step.

17. A computer implemented method as recited in claim 13 wherein the method is performed by a client of the database.

18. A computer implemented method as recited in claim 17 wherein the client is an object resident in the computer system.

19. A computer implemented method for managing a database resident in a computer system, the computer system being intended for use in a distributed object operating environment, the database including a transient database cache and a persistent database portion, the database operable to maintain data persistently for a plurality of database clients, the method including the computer controlled steps of:

performing a data write operation that writes data into said transient database cache, said data written into the cache by a one of said plurality of database clients, said data being intended for storage in the persistent database portion, said transient database cache operable to simultaneously store data received from multiple data write operations;

setting a cache dirty variable to a first state that indicates that the transient database cache includes data intended for storage in the persistent database portion;

performing a data commit operation which commits said data intended for said persistent database portion to said persistent database portion, the data commit operation being performed after the cache dirty variable has been set to the first state, the data commit operation operable to commit data in said transient data cache as if the data intended for the persistent database portion is coming from a single client; and after the performance of the data commit operation, setting said cache dirty variable to a second state that indicates that said transient database cache does not include data which must be committed to said persistent database portions.

whereby said database may maintain data persistently for the plurality of database clients in said persistent database portion as if only a single client were using said persistent database portion.

20. A computer implemented method as recited in claim 19 wherein the computer system further includes a cache free condition variable having a cache commit request variable and a transaction counter and wherein said step of performing a data write operation includes the computer controlled steps of:

incrementing said transaction counter by a predetermined value, said transaction counter being indicative of the number of active data write operations;

writing the data intended for said persistent database portion into said transient database cache; and decrementing said transaction counter by said predetermined value after said writing step is complete.

21. A computer implemented method as recited in claim 20 wherein the computer system further includes an associated cache free mutex, the data write operation further comprising the computer controlled steps of:

locking said cache free mutex prior to the transaction counter incrementing step thereby protecting said cache free condition variable from other operations;

unlocking said cache free mutex after the transaction counter incrementing step has been performed;

locking said cache free mutex prior to the transaction counter decrementing step; and unlocking said cache free mutex after the transaction counter decrementing step has been performed.

22. A computer implemented method as recited in claim 20 wherein the data write operation further includes the step of prior to said step of incrementing the transaction counter, determining whether the cache commit request variable indicates that the data commit operation is active, wherein when it is determined that the data commit operation is active, the transaction counter incrementing, data writing and transaction counter decrementing steps are delayed until the cache commit request variable transitions to indicate that the data commit operation is not active.

23. A computer implemented method as recited in claim 22 wherein when it is determined that the data commit operation is not active, the transaction counter incrementing, data writing and transaction counter decrementing steps are performed substantially immediately.

24. A computer implemented method as recited in claim 22 wherein said step of performing said data commit operation includes the computer controlled step of setting the cache commit request variable to indicate that said data commit operation is active.

25. A computer implemented method as recited in claim 24 wherein the step of performing said data commit operation further comprises the computer controlled step of:

(a) determining whether there are any active data write operations based on the value stored in the transaction counter, wherein when it is determined that no data write operations are active the data in the transient database cache is written into the persistent database portion and the cache commit request variable is set to indicate that said data commit operation is not active.

26. A computer implemented method as recited in claim 25 wherein when the cache commit request variable is set to indicate that the data commit operation is not active, a cache commit request variable wakeup call is broadcast.

27. A computer implemented method as recited in claim 25 wherein when it is determined that there is an active data write operation, the step of performing a data commit operation further includes the computer controlled steps of:

(b) waiting for the reception of a wakeup call indicating that said transaction counter has changed to be received; and (c) repeating step (a) of claim 7.

28. A computer implemented method as recited in claim 27 wherein when the cache commit request variable is set to indicate that the data commit operation is not active, a cache commit request variable wakeup call is broadcast.

29. A computer implemented method as recited in claim 20 wherein:

the computer system further includes an associated cache free mutex;

the data write operation further includes the computer controlled steps of prior to said step of incrementing the transaction counter, determining whether the cache commit request variable indicates that the data commit operation is active, wherein when it is determined that the data commit operation is active, the transaction counter incrementing, data writing and transaction counter decrementing steps are delayed until the cache commit request variable transitions to indicate that the data commit operation is not active, and wherein when it is determined that the data commit operation is not active, the transaction counter incrementing, data writing and transaction counter decrementing steps are performed substantially immediately;

the step of performing said data commit operation includes the computer controlled steps of, setting the cache commit request variable to indicate that said data commit operation is active, determining whether there are any active data write operations based on the value stored in the transaction counter, wherein when it is determined that no data write operations are active the data in the transient database cache is written into the persistent database portion, and the cache commit request variable is set to indicate that said data commit operation is not active; and the cache free mutex is unlocked prior to and unlocked after each transaction counter incrementing step, each transaction counter decrementing step, and each cache commit request variable setting step.

30. A computer implemented method as recited in claim 19 wherein the steps of performing a data write operation and setting a cache dirty variable to indicate that said transient database cache includes data intended for said persistent database portion are performed by an object resident in a computer process executing on said computer system.

31. A computer implemented method as recited in claim 19 wherein the steps of performing a data commit operation and setting a cache dirty variable to indicate that said transient database cache does not include data intended for said persistent database portion are performed by a time commit thread executing in said computer system.

32. A computer implemented method for performing an orderly shutdown of a time commit thread as described in claim 31, the method including the computer controlled steps of receiving a start shutdown command and determining whether there is any data in the transient database cache based upon the state of the cache dirty variable, wherein when it is determined that there is no data in the transient database cache, a signal is sent indicating that the shutdown is complete.

33. A computer implemented method for performing an orderly shutdown of a time commit thread as described in claim 31 the method including the computer controlled steps of receiving a start shutdown command and determining whether there is any data in the transient database cache based upon the state of the cache dirty variable, wherein:

when it is determined that there is data in the transient database cache, a determination is made as to whether there are any active data write operations based on the value of the transaction counter; and when it is determined that there are no active data write operations, a data commit operation is performed and a signal is sent indicating that the shutdown is complete.

34. A computer implemented method for performing an orderly shutdown of a time commit thread as described in claim 31, the method including the computer controlled steps of receiving a start shutdown command and determining whether there is any data in the transient database cache based upon the state of the cache dirty variable, wherein:

when it is determined that there is data in the transient database cache, a determination is made as to whether there are any active data write operations based on the value of the transaction counter; and when it is determined that there are active data write operations, a warning is transmitted indicating to all active data write operations that an abort is impending, all active data write operations are aborted, a signal is sent indicating that the shutdown is complete.

35. A computer implemented method as recited in claim 19 wherein said step of performing said data commit operation includes the computer controlled step of setting a cache commit requested variable to indicate that said data commit operation is active.

36. A computer implemented method for committing data from a transient database cache to a persistent database portion, the transient database cache and the persistent database portion each being an element of a database being intended to reside in a computer system, the database operable to maintain data persistently for a plurality of database clients, the transient database cache operable to simultaneously store data received from multiple data write operations, the computer system being suitable for use in a distributed object operating environment, the method including the computer controlled steps of:

determining whether a cache dirty variable indicates that the transient database cache includes data intended for the persistent database portion;

setting a cache commit request variable to indicate that a commit data operation is in progress when it is determined that the transient database cache includes data intended for the persistent database portion;

after the cache commit request variable setting step, determining whether a transaction counter indicates that data write operations are active, the data write operations being operable to write data to the transient database cache;

committing data in the transient database cache to the persistent database portion when the transaction counter indicates that no data write operations are active; and after the committing data step, setting the cache dirty variable to indicate that the transient database cache does not include data intended for the persistent database portion.

37. A computer implemented method as recited in claim 36 wherein the cache dirty variable is an element of a cache dirty condition variable which further includes a corresponding cache dirty mutex, the method further including the computer controlled steps of:

locking the cache dirty mutex prior to the cache dirty variable determining step;

simultaneously entering a sleep state and unlocking the cache dirty mutex when the cache dirty variable indicates that the transient database cache does not include data intended for the persistent database portion; and locking the cache dirty mutex in response to receiving a wakeup call indicating the cache dirty variable has changed its value.

38. A computer implemented method as recited in claim 36 wherein the cache commit request variable and the transaction counter are elements of a cache commit condition variable which further includes a corresponding cache commit mutex, the method further including the computer controlled step of locking the cache mutex prior to the step of setting the cache commit request variable.

39. A computer implemented method as recited in claim 38 further including the following computer controlled steps performed prior to the cache commit request variable setting step:

entering a timed sleep state when the transaction counter indicates that data write operations are in progress;

waking up when the timed sleep state terminates; and determining if the transaction counter indicates that data write operations are still in progress.

40. A computer implemented method as recited in claim 36 wherein the cluster dirty variable is an element of a cluster dirty condition variable, the method further including the computer controlled steps of:

locking the cluster dirty mutex prior to the steps of setting the cluster dirty variable; and unlocking the cluster dirty mutex after the step of setting the cluster dirty variable.

* * * * *